United States Patent
Abou-Kasm et al.

(10) Patent No.: US 9,136,784 B2
(45) Date of Patent: Sep. 15, 2015

(54) UNIVERSAL CONTROL UNIT FOR BRUSHED OR BRUSHLESS DC MOTOR

(75) Inventors: Rachid G. Abou-Kasm, Grosse Pointe Farms, MI (US); Robert W. Leschuk, Oxford, MI (US); Donald A. Eveleth, Highland, MI (US); Daniel R. Gee, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 13/424,986

(22) Filed: Mar. 20, 2012

(65) Prior Publication Data

US 2013/0249458 A1   Sep. 26, 2013

(51) Int. Cl.
| | | |
|---|---|---|
| H02P 6/14 | (2006.01) | |
| H02P 1/04 | (2006.01) | |
| H01B 7/30 | (2006.01) | |
| H02P 6/08 | (2006.01) | |
| H02P 7/292 | (2006.01) | |

(52) U.S. Cl.
CPC ............... *H02P 6/085* (2013.01); *H02P 7/292* (2013.01)

(58) Field of Classification Search
USPC .......... 318/400.27, 400.26–400.29, 746–747, 318/773, 799, 801, 430, 529, 541
See application file for complete search history.

(56) References Cited

U.S. PATENT DOCUMENTS

| | | | |
|---|---|---|---|
| 4,243,894 A * | 1/1981 | Kuntner et al. ............... 307/147 |
| 4,996,469 A * | 2/1991 | DeLange et al. .............. 318/757 |
| 5,486,747 A * | 1/1996 | Welch ............................ 318/811 |
| 5,687,277 A * | 11/1997 | Matsuzaki et al. ............ 388/804 |
| 5,917,295 A * | 6/1999 | Mongeau ................. 318/400.29 |
| 6,091,216 A * | 7/2000 | Takahashi et al. ....... 318/400.09 |
| 6,239,576 B1 * | 5/2001 | Breslin et al. ................. 318/805 |
| 7,021,418 B2 * | 4/2006 | Tominaga et al. ............. 180/444 |
| 7,719,220 B2 * | 5/2010 | Newman, Jr. .................. 318/483 |
| 8,436,564 B2 * | 5/2013 | Kern et al. ................ 318/400.32 |
| 2001/0017784 A1 * | 8/2001 | Asai et al. ...................... 363/148 |
| 2002/0096947 A1 * | 7/2002 | Namai .......................... 310/68 B |
| 2002/0142529 A1 * | 10/2002 | Matsuda et al. ............... 438/175 |
| 2002/0176265 A1 * | 11/2002 | Oates .............................. 363/35 |
| 2004/0217724 A1 * | 11/2004 | Nagasawa et al. ............. 318/280 |
| 2005/0077846 A1 * | 4/2005 | Makaran .......................... 318/34 |
| 2008/0067961 A1 * | 3/2008 | Chang et al. ................... 318/432 |
| 2009/0059625 A1 * | 3/2009 | Viitanen et al. ................. 363/36 |
| 2009/0073761 A1 * | 3/2009 | Hemink .................... 365/185.02 |
| 2009/0279338 A1 * | 11/2009 | Inagawa et al. ................ 363/160 |

FOREIGN PATENT DOCUMENTS

| | | | |
|---|---|---|---|
| EP | 1934485 A1 | 6/2008 | |
| WO | WO2006131415 A1 | 12/2006 | |

OTHER PUBLICATIONS

Chinese Office Action dated Jan. 26, 2015, 8 pages.
German Office Action dated Jun. 30, 2015, 5 pages.

* cited by examiner

*Primary Examiner* — Paul Ip
*Assistant Examiner* — Devon Joseph
(74) *Attorney, Agent, or Firm* — Reising Ethington P.C.; Lionel D. Anderson

(57) ABSTRACT

A universal control unit for driving a brushed or a brushless DC motor, such as the type commonly employed in a vehicle fuel pump or other vehicle application. According to exemplary embodiments, a universal control unit includes a processing device and an output stage, and is connected to either a brushed or a brushless DC motor in a manner that accommodates the two different motor types so that a common or universal controller can be used.

16 Claims, 7 Drawing Sheets

UNIVERSAL CONTROL UNIT FOR BRUSHED OR BRUSHLESS DC MOTOR

FIELD

The present invention generally relates to electric motors and, more particularly, to a universal control unit that can drive either a brushed or a brushless DC motor.

BACKGROUND

There are many different types of electric motors including those that are AC or DC, brushed or brushless, sensored or sensorless, and that serve open- or closed-loop applications, to cite a few examples. Some common electric motor applications for vehicles include fuel pumps, blowers, cooling fans, etc., but electric motors have been used throughout the vehicle in other applications as well. In the case of fuel pumps, most electric fuel pump motors were traditionally brushed DC motors, however, there is currently an effort to transition from brushed to brushless DC motors. The algorithms and circuitry that control a brushed DC motor are somewhat different from those that control a brushless DC motor, thus, different software and hardware are usually required when switching from one motor type to the other.

It would be desirable to develop a universal control unit that is capable of driving either a brushed or a brushless DC motor so that the system can be used with either motor type, thereby reducing costs and facilitating reusability.

SUMMARY

According to one embodiment, there is provided a universal control unit for either a brushed or a brushless DC motor that comprises a processing device and an output stage coupled to the processing device. The output stage has a plurality of output connections that connect the universal control unit to either a brushed or a brushless DC motor. If the universal control unit is in a brushed operating mode, then the processing device is configured to execute a brushed motor algorithm for a brushed DC motor and the output connections are spliced together. If the universal control unit is in a brushless operating mode, then the processing device is configured to execute a brushless motor algorithm for a brushless DC motor and the output connections are not spliced together.

According to another embodiment, there is provided a universal control unit that comprises a processing device and a hex-bridge driver. The processing device has an electronic processor and an electronic memory with a brushed motor algorithm stored thereon. The hex-bridge driver is coupled to the processing device and has a plurality of switches arranged in a multi-phase configuration and a plurality of output connections that are spliced together so that the universal control unit is connected to a brushed DC motor over a single connection.

According to another embodiment, there is provided a method for operating a brushed DC motor. The method may comprise the steps of: (a) providing a control unit having a processing device and an output stage, wherein the output stage has a plurality of switches arranged in a multi-phase configuration; (b) executing a brushed motor algorithm with the processing device that causes alternating sequences of switches in the output stage to turn 'on' and provide electrical current to a plurality of output connections; and (c) driving the brushed DC motor with the electrical current from the plurality of output connections in the output stage, wherein the plurality of output connections are spliced together.

DRAWINGS

Preferred exemplary embodiments will hereinafter be described in conjunction with the appended drawings, wherein like designations denote like elements, and wherein:

FIG. 1 is a schematic view of an exemplary universal control unit that can be used to drive either a brushed or a brushless DC motor;

FIGS. 2*a*-*c* are more detailed schematic views of the universal control unit of FIG. 1, where the control unit is configured to drive a brushed DC motor according to several different exemplary arrangements;

DESCRIPTION

Figure 1:
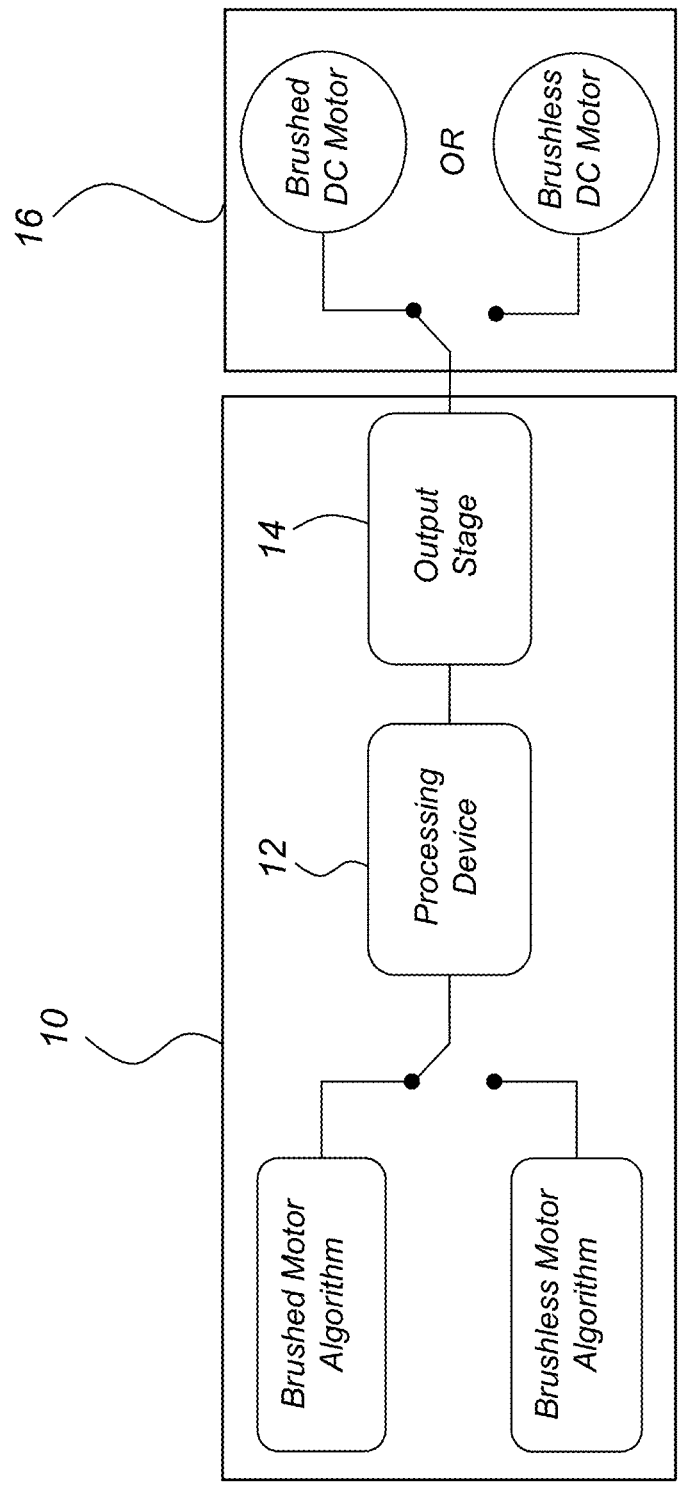

The universal control unit described below may be used to control a brushed or a brushless DC motor, such as the type commonly employed in a vehicle fuel pump or other vehicle application. According to exemplary embodiments shown in FIGS. 2*a* and 3, universal control unit 10 includes a processing device 12 and an output stage 14, and is connected to either a brushed or a brushless DC motor 16 (which is external to the universal control unit) in a manner that accommodates the two different motor types so that a common or universal controller can be used. Although the following description is provided in the context of brushed and brushless DC motors, it should be appreciated that the universal control unit described herein may be used with other motor types and is not limited to the specific examples provided below.

Processing device 12 is coupled to output stage 14 and performs either a brushed or a brushless motor algorithm so that both types of motors can use the same universal control unit. In one example, processing device 12 includes an electronic processor 20, an electronic memory 22, electronic interfaces or outputs 24, 26 and/or other suitable components, and can drive output stage 14 in one of two operating modes: a brushed operating mode where the processing device executes a brushed motor algorithm or a brushless operating mode where the processing device executes a brushless motor algorithm. Providing processing device 12 with control schemes for brushed or brushless commutation (the electronic instructions for one or both of these algorithms may be stored in electronic memory 22) allows universal control unit 10 to be used in either a brushed or a brushless application, thereby increasing the flexibility in its use and design. It should be appreciated that the configuration or architecture of processing device 12, as well as its various sub-components, is not limited to the basic and schematic representation shown in the drawings and that the actual configuration of such a device could vary from that shown here.

Electronic processor 20 acts as the primary processing unit for processing device 12 and may include one or more microprocessors, microcontrollers, application specific integrated circuits (ASICs), and/or any other suitable device known in the art. As mentioned above, electronic processor 20 is designed to execute or carry out electronic instructions embodied in the form of software, firmware, programs, algorithms, scripts, etc., such as those contained within the brushed or brushless motor algorithms. The electronic processor may also communicate with other devices, modules and/or systems in the vehicle, such as an engine control module (ECM), and can execute corresponding instructions from such devices as well.

Electronic memory 22 functions as the primary memory source for processing device 12 and may take any suitable form known in the art. Skilled artisans will appreciate that electronic memory 22 may be a single memory component or it could include a collection of memory components, and it may be located on the same chip as electronic processor 20 or located off-chip, to cite several possibilities. The brushed motor algorithm, the brushless motor algorithm, or both algorithms may be stored or maintained in electronic memory 22. In one example, both the brushed and brushless motor algorithms are provided in an integrated software package that is saved in electronic memory 22 (e.g., permanently saved during manufacture) so that a single part number can be used for processing device 12, regardless of whether it is setup for a brushed or brushless application. If an integrated software package with both brushed and brushless motor algorithms is provided, then some type of setting, flag or other type of indicator may be set in software so that electronic processor 20 knows which algorithm to execute. In a different example, only the motor algorithm that is needed to operate the connected motor is stored in electronic memory 22 (in the case of the FIG. 2a embodiment, only the brushed motor algorithm would be stored).

Electronic interfaces 24, 26 serve as outputs for coupling processing device 12 to output stage 14. In the exemplary arrangement shown in FIGS. 2a and 3, electronic interface 24 is an I/O component that is located on the same chip as electronic processor 20 and connects the chip to a series of output connections 30 so that instructions from a brushed motor algorithm can be provided to output stage 14. Electronic interface 26, on the other hand, is an I/O component that provides instructions or commands to output stage 14 via connections 32 when a brushless motor algorithm is being run. In this manner, a single processing device 12 can provide instructions or commands for driving either a brushed or a brushless DC motor, where brushed motor commands are outputted via electronic interface 24 and connections 30 and brushless motor commands are provided via electronic interface 26 and connections 32. As illustrated, connections 30 and 32 may be joined or tied to one another so that a common set of connections 34 is used to connect with output stage 14. It should be appreciated that it is not necessary for electronic interfaces 24, 26 to be separate I/O components, as they could be integrated or multiplexed together or provided in some other suitable form.

Position sensor 38 (shown only in FIG. 3) is optional and may be used to provide processing device 12 with feedback regarding the position, speed, direction, etc. of a brushless DC motor. Position sensor 38 can include actual position sensing components, such as Hall Effect sensors, which are coupled to brushless DC motor 16 and provide processing device 12 with a position signal representative of motor position. In a different embodiment, processing device 12 calculates or infers the position of the motor through software (separate position sensors 38 are not needed) by examining the waveforms in the motor which include counter or back EMF waves from the inertia of the current flowing through the coils in the motor. From this waveform examination, the rotational position of the brushless DC motor can be determined Other methods and techniques for determining motor position, speed, direction, etc. may also be used.

Figure 2A:
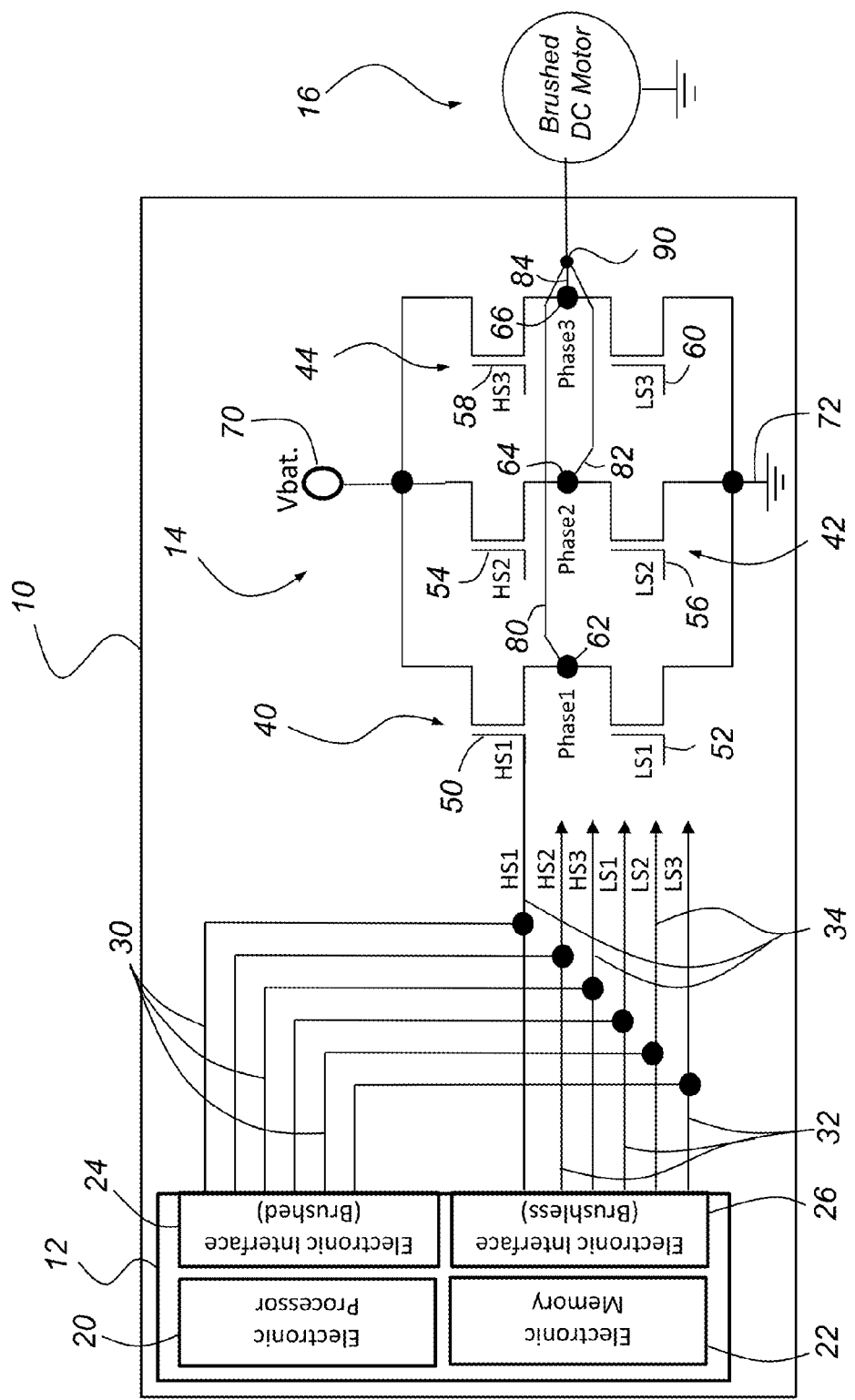
Figure 3:
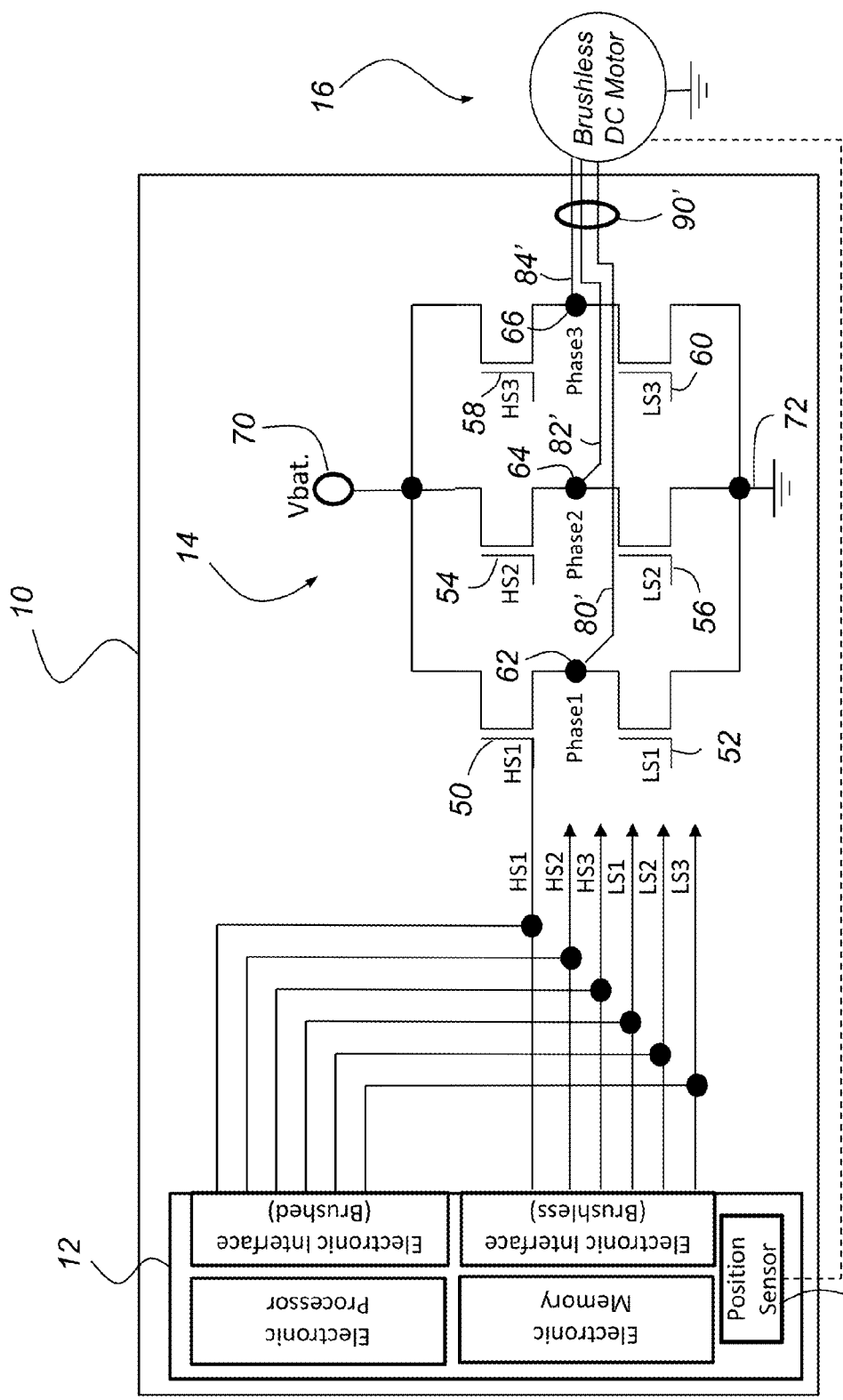
FIG. 3 is a more detailed schematic view of the universal control unit of FIG. 1, where the control unit is configured to drive a brushless DC motor.

Again, processing device 12 has been provided in FIGS. 2a and 3 simply to illustrate one potential embodiment and is not intended to limit the configuration, arrangement and/or architecture of that device. The processing device, as well as its various components, may be provided according to any number of different embodiments, including those that vary significantly from that shown here. According to several non-limiting examples, suitable processing devices may be available from Hella Electronics, Omron and Continental corporations in the form of fuel pump controllers.

Output stage 14, also referred to as a hex-bridge driver, is coupled to processing device 12 and either brushed or brushless DC motor 16 and is used to implement the commutation schemes embodied in the motor algorithms. The hex-bridge driver shown in FIGS. 2a and 3 has a multi-phase configuration and includes three phases or legs of the bridge 40-44, six separate switches 50-60 (e.g., MOSFETs or other suitable switching devices), three output nodes 62-66, power 70, and ground 72. In FIG. 2a, the output stage is designed for a brushed DC motor and has output connections 80-84 that join together at splice or junction 90 so that a single connection provides current to the motor, which then uses mechanical commutation to selectively energize the appropriate coils. In FIG. 3, the output stage is designed for a brushless DC motor and includes output connections 80'-84' which are separately maintained at 90' (i.e., the output connections are not spliced or tied together) so that the motor is provided with current over three separate connections. Brushless DC motors such as this rely on electronic commutation to selectively energize the appropriate coils in the motor, as is appreciated by those skilled in the art. By making certain changes to the way that output stage 14 connects with DC motor 16, as well as executing the appropriate motor algorithm at processing device 12, the universal control unit 10 can be adapted for use with either a brushed or a brushless DC motor, while still using the same basic hardware. A more detailed explanation of how the processing device governs the output stage and how the output stage drives the DC motor is provided below.

Splice 90 is an electrical junction that ties the outputs from the different phases or legs 40-44 together so that output stage 14 can provide the brushed DC motor with a single phase when the universal control unit is being run in a brushed operating mode (FIG. 2a). The exact configuration and location of splice 90 may vary, depending on the needs of the application. For example, it is possible for the splice or junction to be implemented via soldered surface mount zero Ohm bridges so that it is a part of the internal circuitry of the universal control unit. In a different embodiment, splice 90 is implemented external to the universal control unit in a wiring harness or the like. When the universal control unit is being run in a brushless operating mode, splice 90 is removed so that connections 80'-84' individually connect with the brushless motor winding terminals according to a three-phase configuration (FIG. 3); this enables the output stage to provide the brushless DC motor with the required three phase electronic commutation.

Figure 2B:
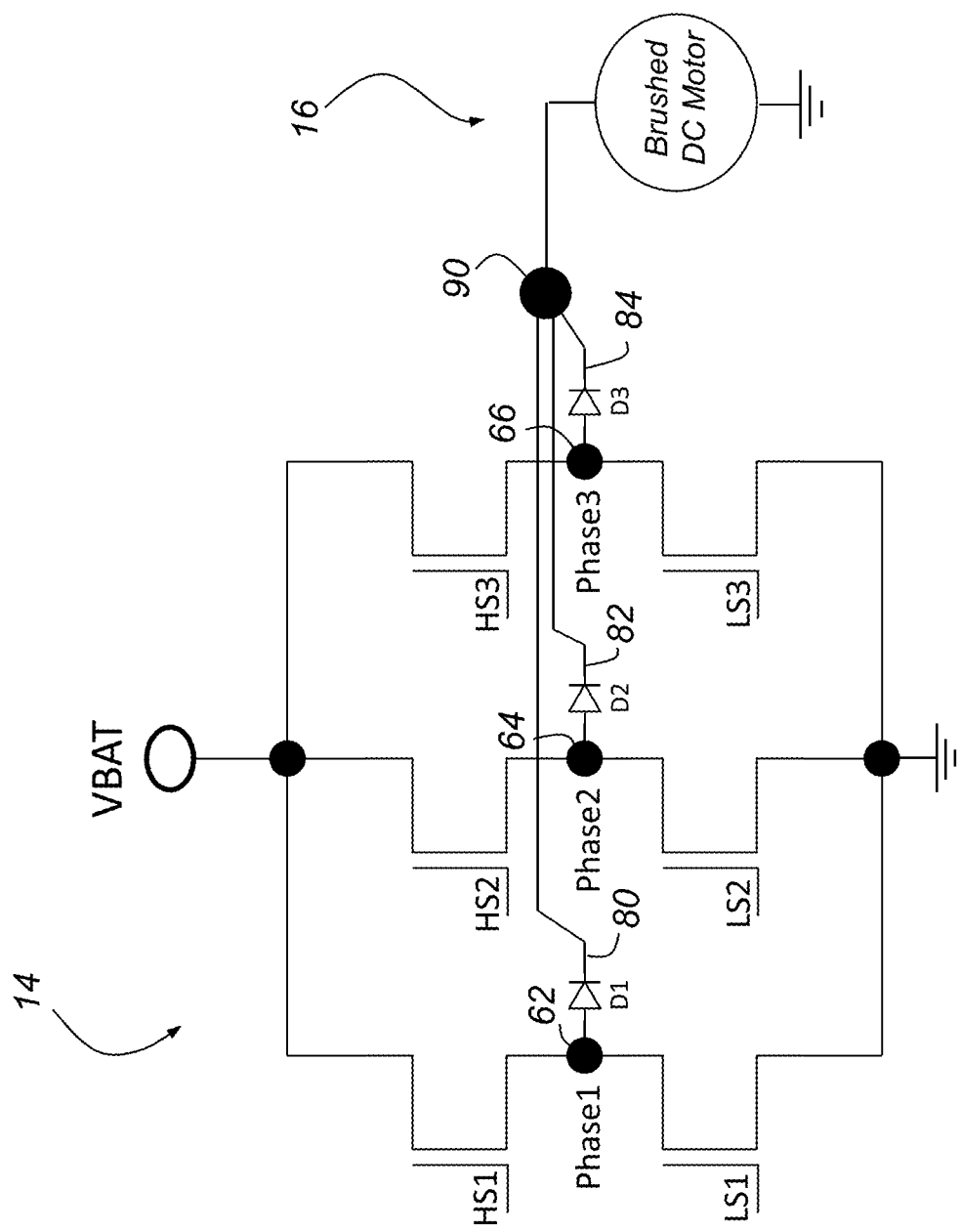
Figure 2C:
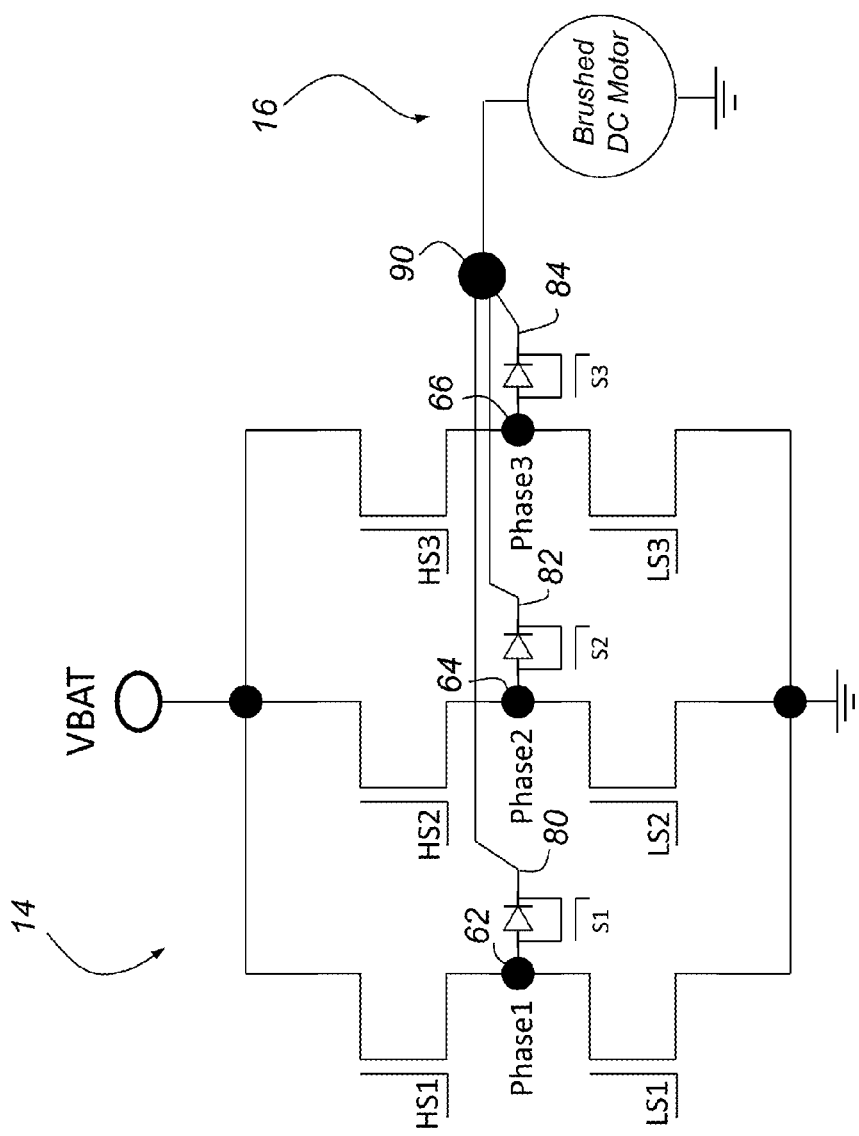

Some alternative designs for output stage 14 are shown in FIGS. 2b and 2c, where the primary differences between these designs and that of FIG. 2a relates to output connections 80-84 and/or splice 90. The other components of the universal control unit may be the same as in the previous embodiments. In the example of FIG. 2b, splice 90 is accomplished by employing diodes D1, D2 and D3 in each of the output connections 80-84. Phase 1 is connected to brushed DC motor 16 via node 62, output connection 80 (which includes diode D1), and splice 90; phase 2 is connected to the brushed DC motor via node 64, output connection 82 (which includes diode D2), and splice 90; and phase 3 is connected to the brushed DC motor via node 66, output connection 84 (which includes diode D3) and splice 90. In the exemplary arrangement of FIG. 2c, splice 90 is accomplished with the use of electronically controlled switches S1, S2 and S3 (e.g., MOSFETs, etc.) that are each connected between a corresponding node 80, 82, 84 and splice 90. With these designs, both brushed and brushless DC motors can be controlled with a single hardware variant. Additionally, the need for the external splice in the wiring harness may be eliminated.

Output stage 14 has been provided in FIGS. 2a and 3 simply to demonstrate one potential embodiment and is not intended to limit its configuration, arrangement and/or architecture. The output stage, as well as its various components, may be provided according to any number of different embodiments, including those that vary significantly from that shown here. It is possible for output stage 14 and processing device 12 to be fabricated on same chip so that they constitute an integral package or unit, or they may be provided separately. Moreover, other multi-phase configurations for the hex-bridge driver may be used, including those that are half- and/or full-bridge.

Electric motor 16 may either be a brushed or a brushless DC motor. Some examples of applications for electric motor 16, in the context of vehicle applications, include fuel pumps, blowers and cooling fans, as well as motors used to drive automatic door locks, windows, gas tank covers or doors, exhaust gas recirculation (EGR) control, auto-tuned absorbers (ATK), selective catalytic reduction systems for diesel vehicles, and electric park brakes, to name just a few. In FIG. 1, electric motor 16 is shown with two different motors: a brushed DC motor and a brushless DC motor, however, this is only meant to illustrate the point that the universal control unit may be used to drive either motor type. In a vehicle application, for example, universal control unit 10 would likely be connected to one type of motor or the other, but not both. Any number of suitable electric motors may be used, including various brushed and brushless DC motors sold by Continental, Coavis, Bosch and Delphi Corporations. Because the general structure and operation of both brushed and brushless DC motors is well known in the art and because any number of suitable motor types may be used with the universal control unit shown here, a detailed explanation of such motors has been omitted. Electric motor embodiments other than those listed above could also be used, including brushless motors that: have more or less than three phases (e.g., a two-phase brushless DC motor); have in-runner, out-runner or other types of known arrangements; or have delta, wye or other types of known wiring configurations or topologies.

Figure 4:
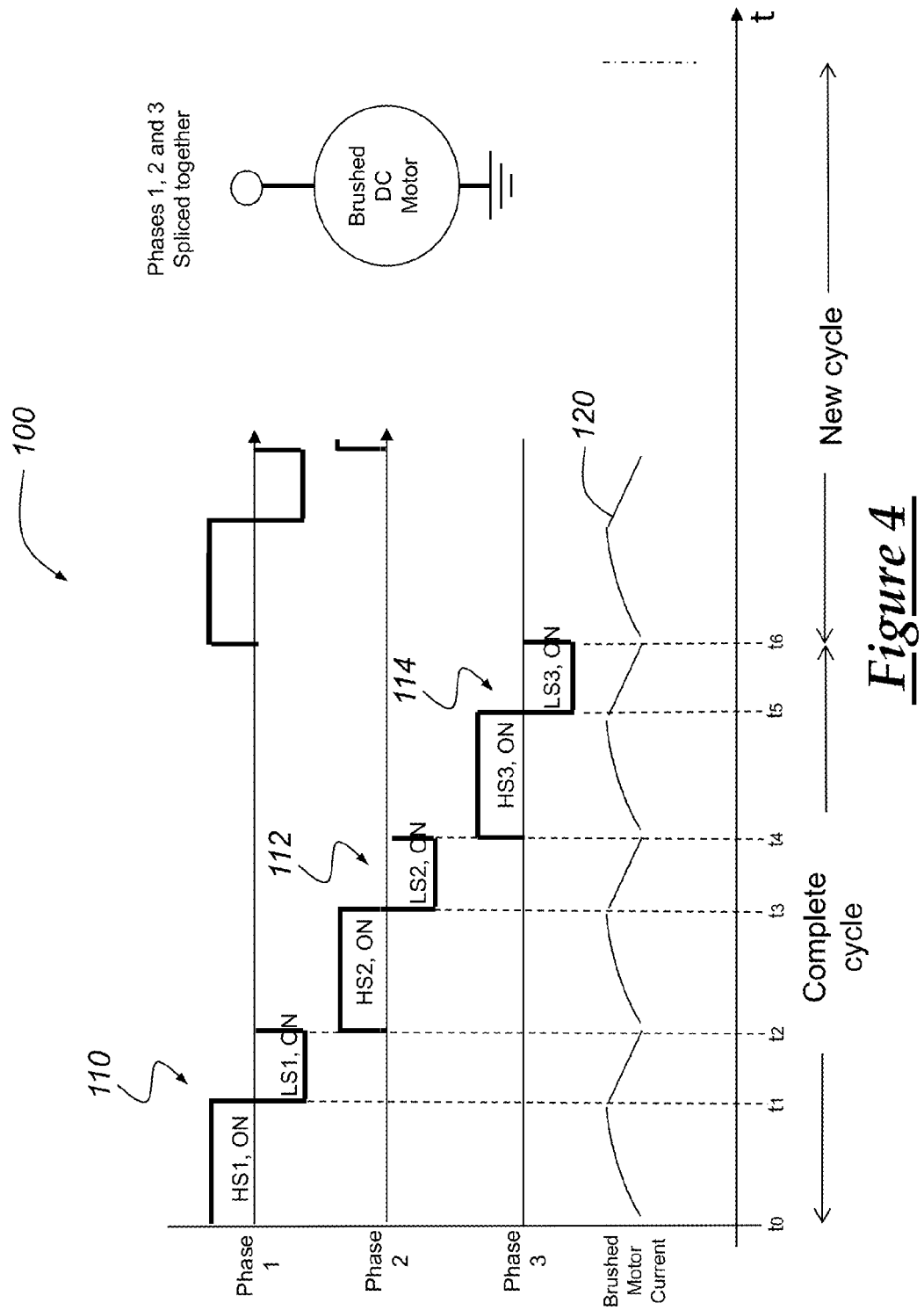
FIG. 4 is a timing chart illustrating a brushed operating mode that may be used with the configuration in FIG. 2*a*.
Figure 5:
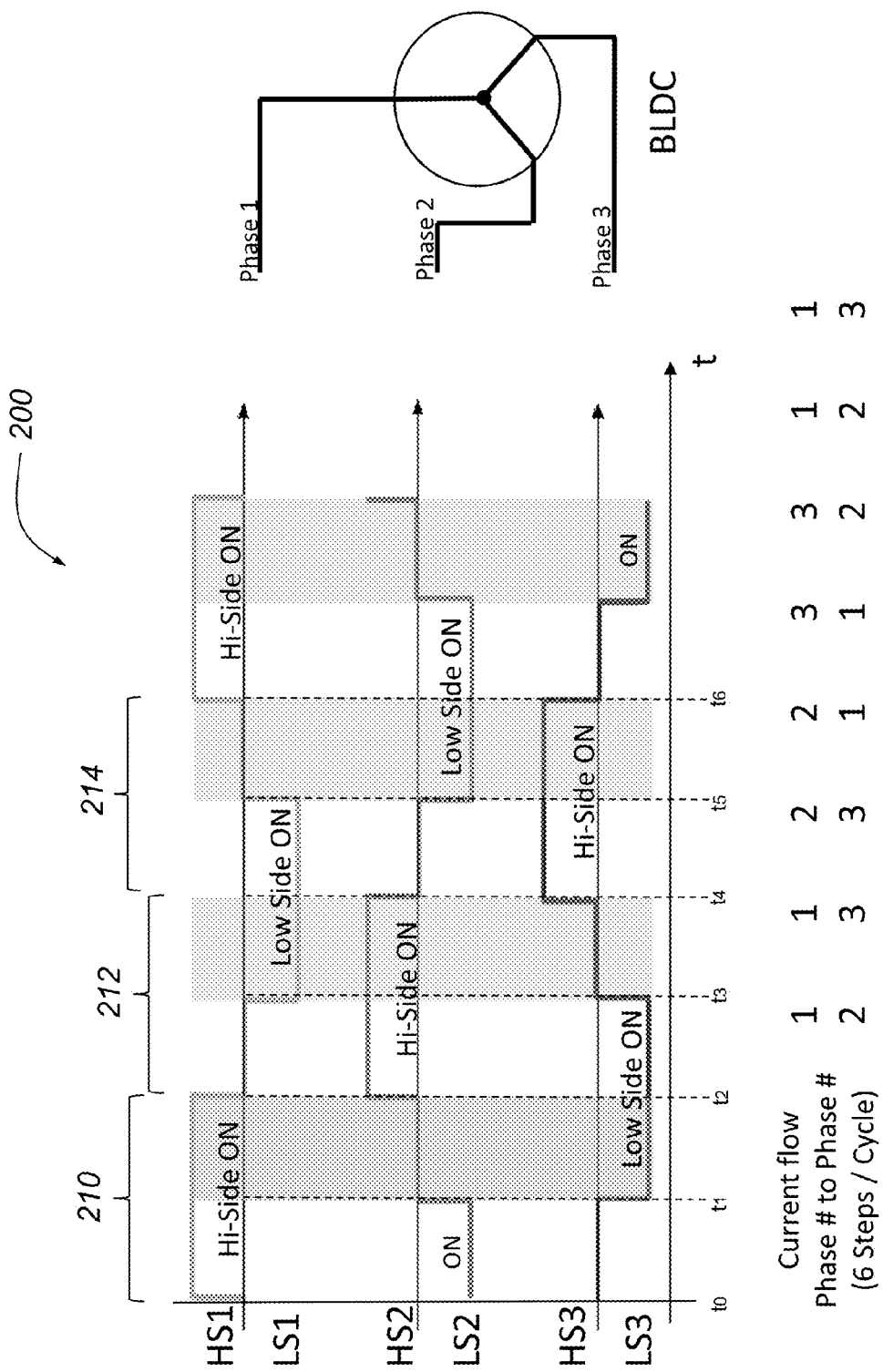
FIG. 5 is a timing chart illustrating a brushless operating mode that may be used with the configuration in FIG. 3.

Turning now to the operation of the universal control unit, FIG. 4 is directed to a brushed operating mode and FIG. 5 is directed to a brushless operating mode. There are a number of potential ways for the control unit to determine which operating mode is appropriate. For instance, at the time of manufacture, software and/or hardware settings, flags or other indicators could be set that instruct processing device 12 as to which motor algorithm it should run—as in the case where both motor algorithms are stored in electronic memory 22. If only one of the motor algorithms is saved in memory, such settings may be unnecessary. In a different example, processing device 12 automatically determines what type of motor the universal control unit is connected to and selects the appropriate motor algorithm accordingly. Other techniques may certainly be employed.

Beginning with the brushed operating mode 100 illustrated in FIG. 4, there is shown the operational state of the six exemplary switches 50-60 in output stage 14, as well as the electrical current being sent to a brushed DC motor 16. In brushed operating mode 100, processing device 12 executes a brushed motor algorithm that controls high- and low-side switches in an interlacing manner (phases 110-114) in order to provide electrical current (plot 120) to a brushed DC motor. During an initial portion of first phase 110 (from time $t_0$ to $t_1$), high-side switch 50 is 'on' while the rest of the switches 52-60 are 'off' so that current flows from power source 70 and through switch 50, node 62, output connection 80, splice 90 and to the windings in brushed DC motor 16. During a recirculation portion of first phase 110 (from time $t_1$ to $t_2$), high-side switch 50 is turned 'off' while low-side switch 52 is turned 'on' so that the current in the motor continues to flow by way of the recirculation path using energy stored in the motor inductance. This path includes motor 16 back through ground 72, low-side switch 52, node 62, output connection 80, splice 90 and return to the windings of the motor.

Following the first phase 110, an initial portion of a second phase 112 (from time $t_2$ to $t_3$) begins with high-side switch 54 turned 'on' while the rest of the switches are turned 'off'. As with the preceding phase, this causes current to flow from power source 70 through switch 54, node 64, output connection 82, splice 90 and the windings of the brushed DC motor. Again, the operating current to electric motor 16 is increasing during this initial or non-recirculating period of the second phase 112. At time t3, high-side switch 54 is turned 'off' and the low-side switch 56 is turned 'on' so that the current in the motor continues to flow by way of the recirculation path using energy stored in the motor inductance. This path includes motor 16, back through ground 72, low-side switch 56, node 64, output connection 82, splice 90 and the motor. A similar sequence of events occurs regarding the initial and recirculating portions of third phase 114 (from time $t_4$ to $t_5$ and from time $t_5$ to $t_6$, respectively), only the current flows through high- and low-side switches 58 and 60, respectively. As just explained, only one of the switches 50-60 in output stage 14 is turned 'on' or is active at a time; the other switches are typically turned 'off'.

A complete cycle of the exemplary three-phase interlacing sequence includes all three separate phases 110-114 and goes from time $t_0$ to time $t_6$, at which point the sequence starts over again. Changes to the duty-cycle could be made using pulse-width-modulation (PWM) or other techniques known to those skilled in the art in order to vary the amount of power being provided to the electric motor. The total power provided to the brushed DC motor 16 is the sum of the three partial powers provided in each of the three operating phases 110-114 by high- and low-side switches. The switching frequency is generally dictated by the electric motor requirements or specifications. Skilled artisans will appreciate that the interlacing method described above creates a current waveform (plot 120) that is similar to those achieved by traditional brushed DC motors, but does so using a modified brushless configuration. A rotor position detection algorithm is not needed for the brushed DC motor because this is performed mechanically in the brushed motor.

The preceding description of the universal control unit differs from traditional modes of operating brushed motors, where the current flows through a single set of switches in the output stage (single phase) and is not interlacing among different phases, as described above. In another embodiment, two or more of the high-side switches 50, 54, 58 are turned 'on' at the same time, as opposed to exclusively alternating between them, so that during an initial portion of the phases current flows in parallel through multiple switches, nodes and output connections to splice 90, and during a recirculation portion current concurrently flows through multiple low-side switches and output connections to splice 90. For instance, all three high-side switches may be 'on' at the same time, as well as all three low-side switches. In a different embodiment, output stage 14 only has two phases (instead of three), and the method shown in FIG. 4 alternates between these two phases in the interlacing or non-interlacing manners described above.

FIG. 5 illustrates a brushless operating mode 200, in which high- and low-side switches 50-60 are controlled by the brushless motor algorithm which is generally dictated by the winding topology of the brushless DC motor 16. Skilled artisans will appreciate that any number of different commutation algorithms may be used to drive a brushless DC motor, including the one shown here. In this particular example, during an initial portion of first phase 210 (from time $t_0$ to $t_1$), high-side switch 50 and low-side switch 56 are turned 'on', while the remaining switches are turned 'off'. During a subsequent portion of first phase 210, the same high-side switch 50 stays 'on' while low-side switch 56 turns 'off' and low-side switch 60 is activated. This type of switching sequence continues in second and third phases 212 and 214, and is careful to avoid a situation where the same high- and low-side switches (e.g., switches 50, 52 in phase 40) are turned 'on' at the same time, as that would create a short circuit between power 70 and ground 72. The average voltage across the brushless DC motor, and hence the motor speed, can be varied by using pulse-width-modulation (PWM) techniques with the high-side switches or drivers, as is understood by those skilled in the art.

Accordingly, universal control unit 10 is able to drive or otherwise control either a brushed or a brushless DC motor by selecting the appropriate motor algorithm and making certain hardware modifications to the system, without incurring the costs of developing and manufacturing a separate motor controller. Traditionally, two separate motor controllers would be needed; one for brushed motors and one for brushless motors.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A universal control unit for either a brushed or brushless DC motor, comprising:
a processing device having an electronic processor and electronic memory for storing at least one of a brushed motor algorithm or a brushless motor algorithm; and
an output stage being coupled to the processing device and having a plurality of high-side and low-side switches, a plurality of nodes, and a plurality of output connections that are arranged in a multi-phase configuration and connect the universal control unit to either a brushed or a brushless DC motor;
when the universal control unit is manufactured in a brushed operating mode, the brushed motor algorithm is stored on the electronic memory and the processing device is selectively configured to execute the stored brushed motor algorithm for a brushed DC motor and the output connections are spliced together, wherein the processing device at the direction of the brushed motor algorithm is configured to control the plurality of switches such that none of the high-side switches are 'on' at the same time that one or more of the low side switches are 'on' when the output connections are spliced together; and
when the universal control unit is manufactured in a brushless operating mode, the brushless motor algorithm is stored on the electronic memory and the processing device is selectively configured to execute the stored brushless motor algorithm for a brushless DC motor and the output connections are not spliced together, wherein the processing device at the direction of the brushless motor algorithm is configured to control the plurality of switches such that one of the high-side switches is 'on' at the same time that one or more of the low side switches are 'on' when the output connections are not spliced together.

2. The universal control unit of claim 1, wherein the electronic memory includes both the brushed motor algorithm and the brushless motor algorithm stored thereon.

3. The universal control unit of claim 1, wherein the plurality of switches and the plurality of nodes are arranged in a three-phase configuration where a first node is associated with a first phase and is coupled to a first output connection, a second node is associated with a second phase and is coupled to a second output connection, and a third node is associated with a third phase and is coupled to a third output connection.

4. The universal control unit of claim 3, wherein the first, second and third output connections are joined together at a splice so that they are connected to a brushed DC motor via a single output connection when the universal control unit is manufactured in a brushed operating mode.

5. The universal control unit of claim 4, wherein the first, second and third output connections are joined together at a splice that is internal to the universal control unit.

6. The universal control unit of claim 4, wherein the first, second and third output connections are joined together at a splice that is external to the universal control unit and is provided within a wiring harness.

7. The universal control unit of claim 4, wherein the first output connection includes a first diode coupled between the first node and the splice, the second output connection includes a second diode coupled between the second node and the splice, and the third output connection includes a third diode coupled between the third node and the splice.

8. The universal control unit of claim 4, wherein the first output connection includes a first switch coupled between the first node and the splice, the second output connection includes a second switch coupled between the second node and the splice, and the third output connection includes a third switch coupled between the third node and the splice.

9. The universal control unit of claim 3, wherein the first, second and third output connections are not joined together at a splice so that they are connected to a brushless DC motor via three separate output connections when the universal control unit is manufactured in a brushless operating mode.

10. The universal control unit of claim 1, wherein the output stage is arranged in a multi-phase configuration that has output connections from a plurality of phases joined together at a splice, and the control unit is configured to alternately energize the plurality of phases when the universal control unit is manufactured in a brushed operating mode.

11. A universal control unit, comprising:
a processing device having an electronic processor and an electronic memory with a brushed motor algorithm stored thereon; and
a hex-bridge driver being coupled to the processing device and having a plurality of switches arranged in a multi-phase configuration that is compatible with either a brushed or brushless DC motor and a plurality of output connections, wherein in a brushed operating mode the output connections of the hex-bridge driver are modified by being spliced together and the processing device is selectively configured to execute the stored brushed motor algorithm while the hex-bridge driver is connected to a brushed DC motor over a single connection.

12. A method for operating a brushed DC motor, comprising the steps of:
a) providing a control unit having a processing device and an output stage, wherein the output stage has a plurality of switches arranged in a multi-phase configuration suitable for either a brushed DC motor or a brushless DC motor;
b) in a brushed operating mode, executing a brushed motor algorithm with the processing device that causes alternating sequences of switches in the output stage to turn 'on' and provide electrical current to a plurality of output connections; and
c) driving the brushed DC motor with the electrical current from the plurality of output connections in the output stage, wherein the plurality of output connections are spliced together.

13. The method of claim 12, further comprising the step of: automatically determining what type of motor the control unit is connected to, and selecting the brushed motor algorithm accordingly.

14. The method of claim 12, wherein step (a) further comprises providing an output stage having a plurality of high- and low-side switches arranged in a three-phase configuration; and step (b) further comprises executing a brushed motor algorithm that causes alternating sequences of high- and low-side switches in the output stage to turn 'on' so that electrical current is provided to the plurality of spliced output connections according to a three-phase interlacing sequence.

15. The method of claim 12, wherein a complete cycle of the three-phase interlacing sequence includes three separate phases, where each phase has an initial portion where electrical current flows through the high-side switches and a recirculating portion where electrical current flows through the low-side switches.

16. A universal control unit for either a brushed or brushless DC motor, comprising:
a processing device having an electronic processor and electronic memory for storing both a brushed motor algorithm and a brushless motor algorithm;
an output stage being coupled to the processing device and having a plurality of switches, a plurality of nodes, and a plurality of output connections that are arranged in a multi-phase configuration and connect the universal control unit to either a brushed or a brushless DC motor;
in a brushed operating mode, the universal control unit is arranged as a brushed motor control unit by having the processing device configured to execute the stored brushed motor algorithm and having the output connections spliced together; and
in a brushless operating mode, the universal control unit is arranged as a brushless motor control unit by having the processing device configured to execute the stored brushless motor algorithm and having the output connections not spliced together.

* * * * *